UNITED STATES PATENT OFFICE.

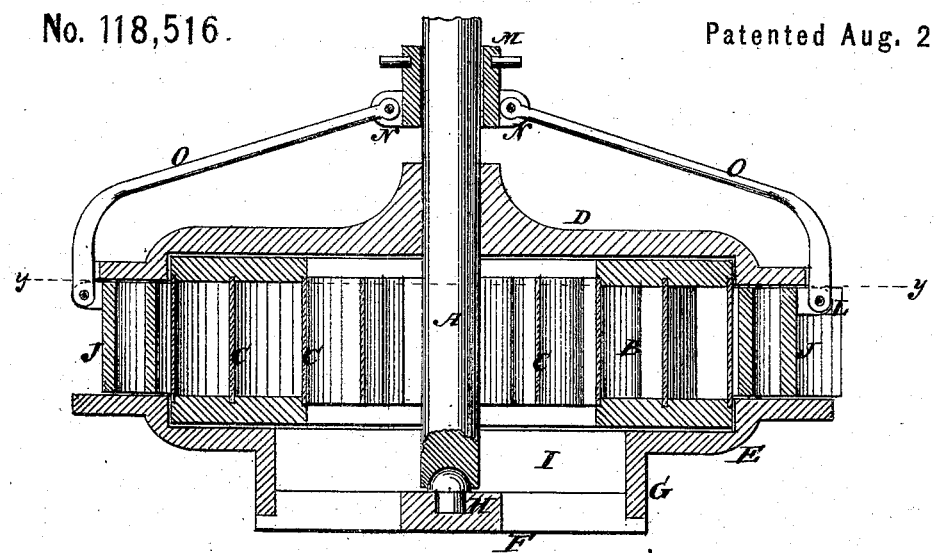
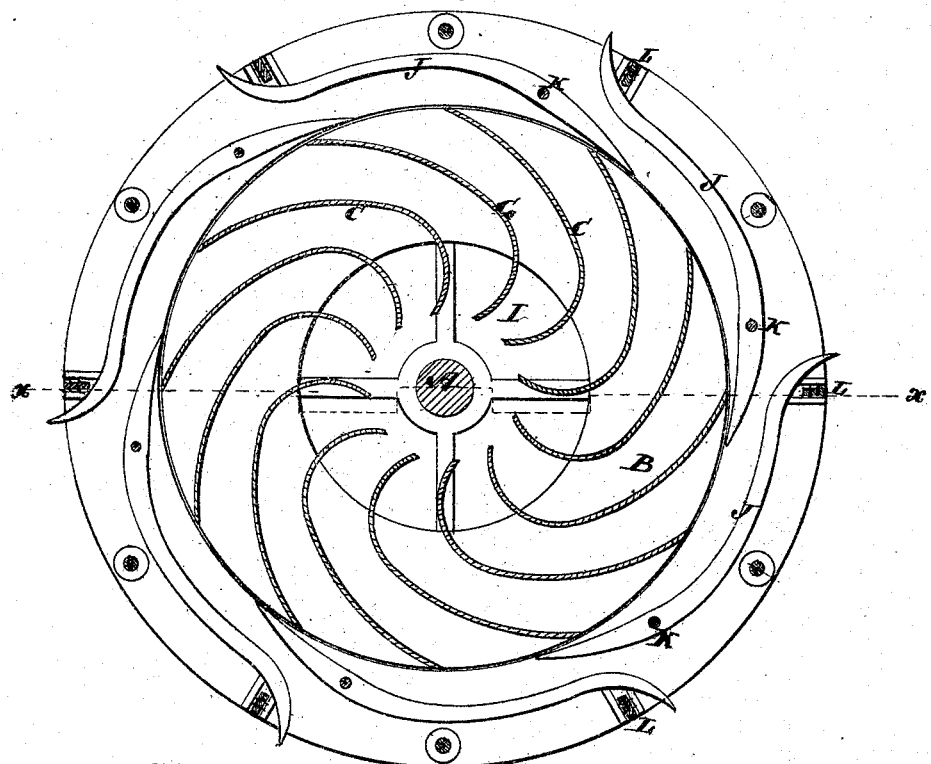

DAVID CRAIK, OF CHURCH MILLS, CHATEAUGAY, NEW YORK.

IMPROVEMENT IN WATER-WHEELS.

Specification forming part of Letters Patent No. 118,516, dated August 29, 1871.

*To all whom it may concern:*

Be it known that I, DAVID CRAIK, of Church Mills, Chateaugay, in the county of Franklin and State of New York, have invented a new and useful Improvement in Water-Wheels; and I do hereby declare that the following is a full, clear, and exact description thereof, which will enable others skilled in the art to make and use the same, reference being had to the accompanying drawing forming part of this specification.

This invention relates to new and useful improvements in water-wheels of the class known as turbine wheels; and consists in the arrangement of the buckets, in the mode of operating the adjustable chutes, and in the general construction, arrangement, and combination of parts, hereinafter more fully described.

In the accompanying drawing, Figure 1 represents a vertical section of the wheel taken on the line x x of Fig. 2. Fig. 2 is a horizontal section taken on the line y y of Fig. 1.

Similar letters of reference indicate corresponding parts.

A is the water-wheel shaft. B is the wheel, which is firmly attached to the shaft. C represents the buckets of the wheel, which are curved plates of sheet-iron or steel, which are properly prepared and set in the mold, and cast with an upper and an under rim, thus forming the entire wheel in a single casting. The wheel is confined to the shaft and revolves between an upper and an under casing-plate. D is the upper plate or cover. E is the under plate, which is open in its central portion for the discharge of the water. F is the bridge-tree or cross attached to the flange G of the lower plate. H is the step supported by the bridge-tree, on which the shaft revolves. The opening in the lower plate is represented by I. It will be seen in Fig. 2 that the curved ends of the buckets project over the opening I, thus retaining the pressure to a certain degree and giving direction to the water. J represents the chutes. Six in number (more or less) may be employed, according to the circumstances of the case or head of water. These chutes are arranged as seen in Fig. 2, and are vibrated on vertical pivots K so as to open and close the water-apertures. It will be seen that the long ends of the chutes lap onto the short ends of the adjacent chutes, and so on around the wheel. The mode of operating or opening and closing the chutes is seen in Fig. 1. The outside of each chute (near the outer end) is provided with lugs or ears, as seen at L. M is a collar, which slides freely on the shaft above the cover D. This collar is also provided with lugs or ears, as seen at N. O represents curved rods, which connect the chutes with the collar by means of the lugs or ears L and N.

When the collar is raised the distance between the collar and the chutes (when the latter are open) is increased. The effect is to draw in the long ends and throw outward the short ends of the chutes, and thus close the water-apertures. A downward movement of the collar opens the apertures, as seen in Fig. 2. The rods operate upon the chutes upon the principle of the toggle-joint. The collar is moved by means of a lever or by any suitable mechanical device so as to control and hold the chutes in any desired position. The upper and the lower casing-plates of the wheel are secured together by bolts, which pass through tubes, the distance between the plates being regulated by the length of the latter. The chutes are curved so as to give the proper direction to the water, which direction is maintained by the curves of the buckets.

After much-practical experience and many special experiments with water-wheels I have found that this form and arrangement of bucket and chute afford the most satisfactory results.

Having thus described my invention, I claim as new and desire to secure by Letters Patent—

1. The arrangement of the buckets C, in regard to the opening I, substantially as shown and described.
2. The arrangement of the chutes J, with regard to each other and to the wheel, substantially as shown and described.
3. The mode of opening and closing the chutes of a water-wheel, substantially as shown and described.
4. The combination of the wheel B, upper and lower plates D and E, chutes J, rods O, and collar M, when constructed and arranged substantially as and for the purposes described.

DAVID CRAIK.

Witnesses:
RALPH SWINBURNE,
SILAS C. DOUGLAS.